Figure 1:
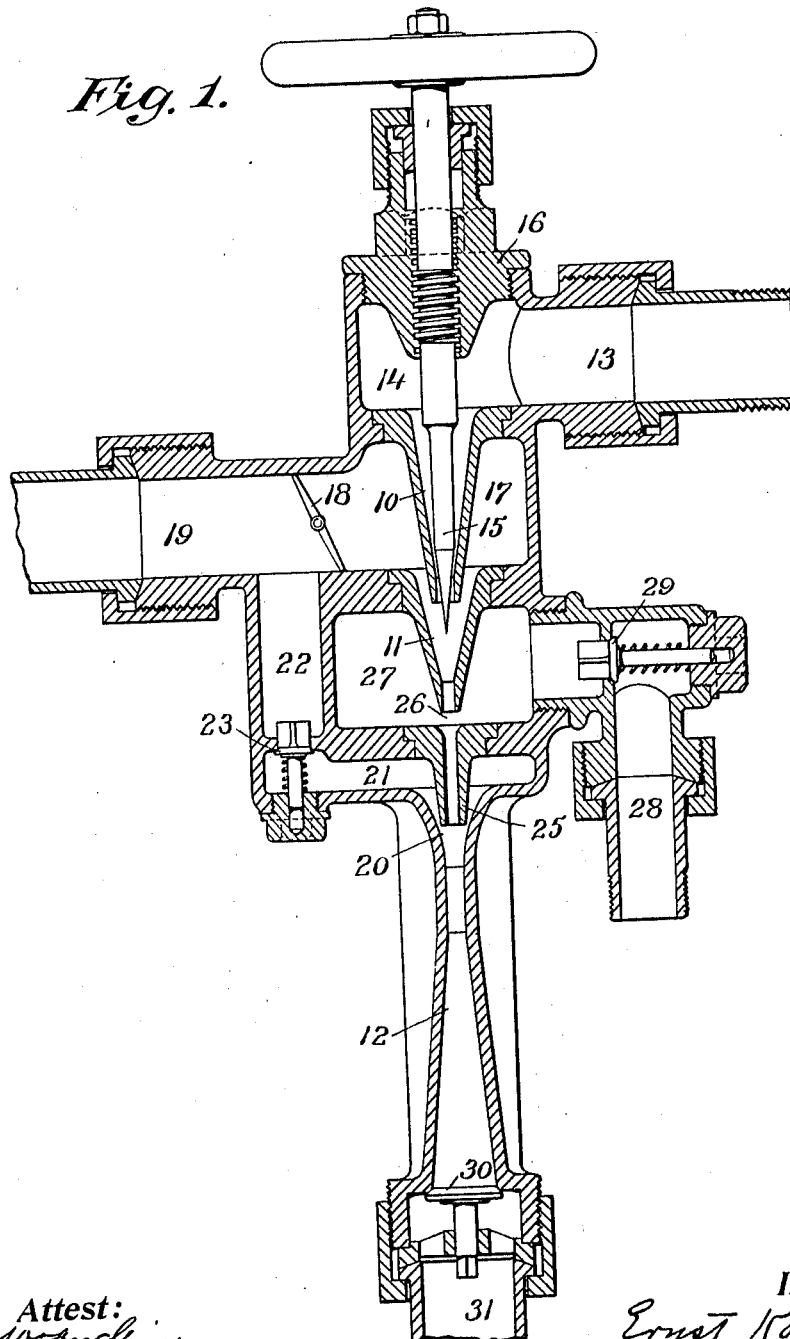

E. KOERTING.
INJECTOR.
APPLICATION FILED JAN. 19, 1910.

1,026,399.

Patented May 14, 1912.

2 SHEETS—SHEET 1.

Attest:

Inventor:

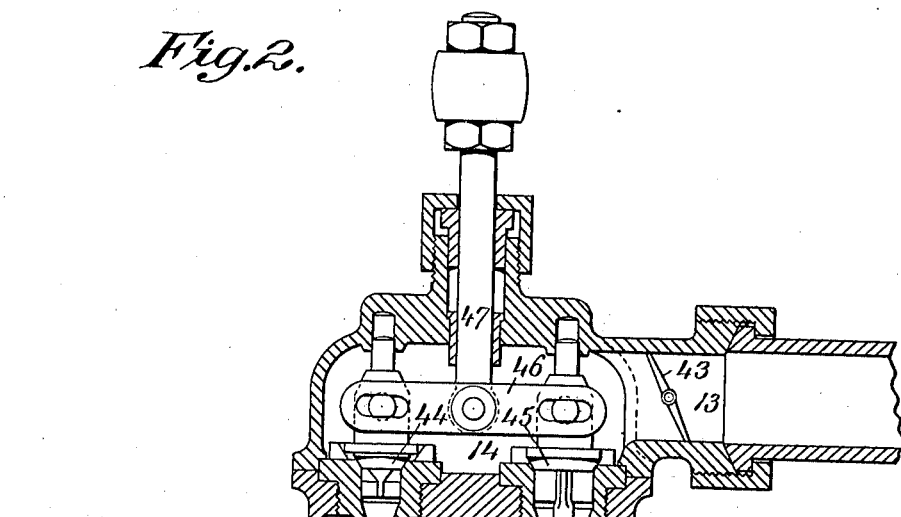
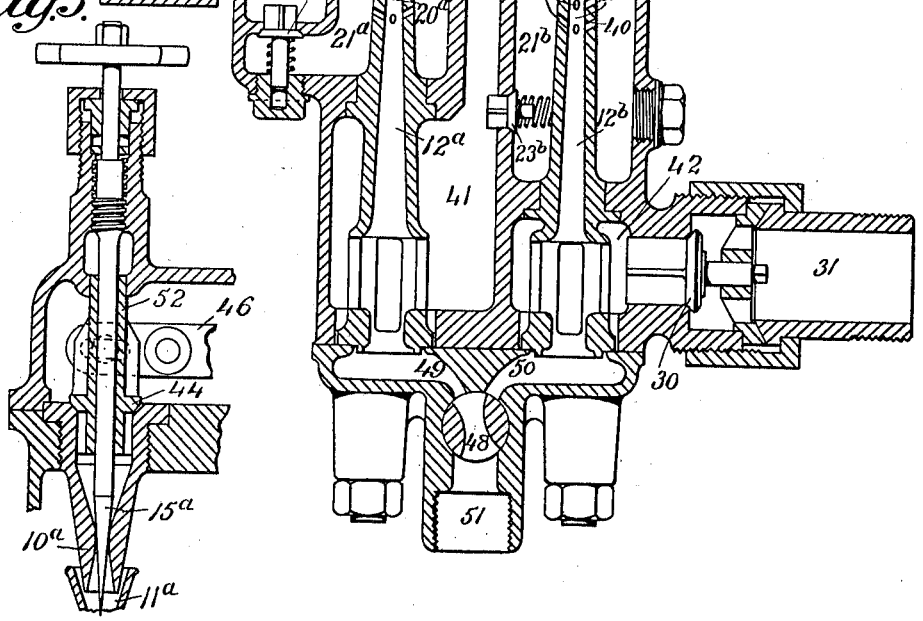

UNITED STATES PATENT OFFICE.

ERNST KOERTING, OF PEGLI, NEAR GENOA, ITALY, ASSIGNOR TO SCHUTTE & KOERTING COMPANY, OF PHILADELPHIA, PENNSYLVANIA, A CORPORATION OF PENNSYLVANIA.

INJECTOR.

1,026,399.

Specification of Letters Patent.

Patented May 14, 1912.

Application filed January 19, 1910. Serial No. 538,869.

*To all whom it may concern:*

Be it known that I, ERNST KOERTING, a subject of the German Emperor, residing at Pegli, near Genoa, Italy, have invented certain new and useful Improvements in Injectors, fully described and represented in the following specification and the accompanying drawings, forming a part of the same.

The object of the invention is to provide a variable capacity injector so constructed that its feeding capacity may be varied within wider limits than is possible with constructions heretofore known, and this without detriment to the safe, efficient and economical operation of the injector. This result is accomplished in accordance with the invention by providing an inlet or opening to the injector tube beyond the main or ordinary combining tube or mixing nozzle, that is, beyond the point or part of smallest cross-section, or critical point, of the injector tube, through which secondary water may be drawn into the injector tube, and by increasing the capacity of the steam nozzle or inlet above the normal, so that when the injector is working at its full capacity with the steam supply wide open, the water in the main combining tube will be given such an excess velocity that the secondary water will be drawn into the injector tube through said inlet or opening to be carried along with the water from the main combining tube or mixing nozzle, and that when the steam supply is partly shut off to cause the injector to work at a considerably reduced capacity, the water in the main combining tube, while still given sufficient impulse or velocity to overcome the counterpressure at the discharge, will not have the excess velocity to draw in the secondary water.

A full understanding of the invention can best be given by a detailed description of preferred constructions embodying the various features of the invention, and such a description will now be given in connection with the accompanying drawings showing single tube and double tube injectors of preferred construction made in accordance with the invention.

The invention is intended specially for feed water injectors for steam boilers, and the injectors shown in the drawings and which will now be described are of this class, but it will be understood that the invention may be applied to injectors intended for other uses.

In said drawings:—Figure 1 is a central sectional view of a single jet or single tube injector of preferred form, constructed in accordance with the invention. Fig. 2 is a similar view of a double tube injector made in accordance with the invention, and Fig. 3 is a sectional view of a portion of a double tube injector having the steam nozzle of the first or water supply tube provided with a regulating spindle.

Referring to the drawings, and first to Fig. 1, the injector tube includes a main or primary mixing couple made up of a nozzle 10 and a combining tube 11, the delivery end of the nozzle entering the flaring entrance end of the combining tube in the usual manner, and a diverging delivery tube or pressure cone 12. In the construction shown, the nozzle 10 is the steam nozzle, and the water enters the combining tube around the end of the steam nozzle. This is the preferable arrangement, but it will be understood that the invention considered broadly is not to be limited to a construction in which the steam enters through the central nozzle of the mixing couple. Steam enters the injector through an inlet 13 to a steam chamber 14, from which it passes into the nozzle 10. A spindle 15 having a tapered end extending into the nozzle 10 and movable longitudinally serves to regulate the amount of steam passing through the nozzle. The spindle is threaded and passes through a threaded cap 16 and through a gland or stuffing box in the usual manner, and is provided outside the injector casing with a hand wheel or other suitable device for turning the spindle to cause its tapered end to advance into or withdraw from the end of the nozzle 10. Water enters the combining tube 11 from a suction chamber 17 into which it is drawn through a suction inlet 19 and past a controlling valve 18. A secondary combining tube having an inlet for secondary water is provided between the combining tube 11 and the discharge tube 12 and beyond the critical point or part of the injector tube, that is, the part of smallest cross-section. As shown in this figure, the secondary combining tube 20 is of tapering form having a flaring entrance for the secondary water open to a secondary suction chamber 21 which communicates with the main water supply pipe 19 through a passage 22, the flow of water to the chamber 21 being controlled by a check valve 23. Water from the primary combining tube 11 is delivered into the secondary combining tube 22 from a nozzle 25, and the water from the secondary combining tube is delivered into the diverging delivery tube or pressure cone 12, the throat between the secondary combining tube and the delivery tube being of a greater cross-section than the critical part or throat between the primary and secondary combining tubes. As shown, the nozzle 25 is formed separate from the combining tube 11 proper, and the entrance end of the nozzle 25 is separated from the discharge end of the combining tube 11 to provide an overflow gap 26 which is open to a chamber 27 to which an overflow pipe 28 is connected through an opening controlled by an outwardly opening check valve 29 which operates in the usual manner as an automatic starting valve. The usual outwardly opening discharge valve 30 is provided at the end of the pressure cone 12, which valve when the injector is not in operation is normally held in its closed position, as shown, by the counterpressure in the discharge pipe 31. The steam nozzle 10 is made of such capacity that when the regulating spindle 15 is withdrawn to its wide open position, the water drawn into the primary combining tube 11 will be impelled with a velocity in excess of the velocity required for overcoming the pressure at the discharge valve 30, with the result that the development of pressure will not begin at or immediately adjacent to the critical cross-section, but the point of development of pressure will be advanced toward the discharge end of the pressure cone a distance which increases with the velocity at the critical cross-section, and within the space between the critical cross-section and the point where the pressure begins there will prevail a considerable diminution of pressure which will cause water to be drawn from the suction chamber 21 into the secondary combining tube 20 and accelerated. As much secondary water will be drawn in as the water jet from the primary combining tube can by reason of its excess velocity accelerate and force against the counterpressure, the amount drawn in increasing as the excess of velocity at the critical cross-section increases. The water controlling valve 18 will be adjusted to control the flow of water to the chamber 17 until there is no loss of water at the gap 26.

For reducing the feed or capacity of the injector, the regulating spindle 15 is screwed down to reduce the steam supply, and the water valve 18 is correspondingly adjusted to prevent loss of water through the gap 26. As the velocity of the water at the critical cross-section decreases, the point where pressure begins retreats toward the critical cross-section, and when the velocity of the water is decreased to a degree which corresponds to the counterpressure at 30, the sucking of water into the secondary combining tube 20 from the chamber 21 stops automatically, the check valve 23 closes, and the injector then works like an ordinary injector.

Referring now to Fig. 2, this figure shows a double tube injector of well known type modified to embody features of the present invention. In constructing a double tube injector to embody the present invention, the second or feeding tube will be constructed and arranged to draw in secondary water, and the first or supply tube may also be, and preferably will be, so constructed and arranged. Fig. 2 shows such a construction, in which both tubes are provided with means for feeding secondary water. As shown in this figure, the first or water supply tube comprises a primary mixing couple made up of a steam nozzle $10^a$ and a combining tube $11^a$, and a diverging delivery tube or pressure cone $12^a$. The combining tube $11^a$ and the pressure cone are connected just beyond the critical, or smallest, cross-section by an intermediate tube section $20^a$ which forms the secondary combining tube and is provided with inclined openings or water inlets 40 which admit water from a secondary suction chamber $21^a$. The part or section $20^a$ of the injector tube which forms the secondary combining tube is of greater cross-section than the adjacent critical portion, and is preferably of diverging form, merging into, and when the injector is working at low capacity under a reduced steam supply forming in effect a part of, the pressure cone or delivery tube. The steam nozzle $10^a$ is of increased capacity to give excess velocity to the primary water impelled from the primary combining tube $11^a$ as in the construction of Fig. 1, and by reason of such excess velocity of the water when sufficient steam is admitted to the nozzle $10^a$, and of the consequent diminution of pressure beyond the critical cross-section as pointed out in connection with Fig. 1, the secondary water will be drawn into the secondary combining tube $20^a$ through the inlet openings 40, and will be impelled forward through the delivery tube or pressure cone $12^a$. With this form of injector tube, it will be observed that the primary and secondary combining tubes and the delivery tube form a continuous passage-way for the water, and these three tubes or parts may be formed integral as shown, although this is of course not necessary. An injector tube such as here shown might, of course, be employed in a single tube, or single jet, injector. The combining tube $11^a$ takes its water from a suction chamber 17$^a$ which is supplied through the inlet 19. The secondary suction chamber 21$^a$ also draws its water from the inlet 19 through a passage controlled by a check valve 23$^a$. The delivery tube 12$^a$ opens to a receiving passage or chamber 41 leading to a suction chamber 17$^b$, from which the second or feeding tube of the injector draws its primary water. The second or feeding tube is, as shown, similar to the first tube, and comprises a steam nozzle 10$^b$, a primary combining tube 11$^b$, a delivery tube or pressure cone 12$^b$, and a secondary combining tube 20$^b$ beyond the critical cross-section and between the primary combining tube and the delivery tube. The primary and secondary combining tubes and the delivery tube, as in the case of the first injector tube, are shown as forming a continuous passageway for the water, and the secondary combining tube is of greater cross-section than the critical portion and as shown is of diverging form and is provided with inclined inlet openings 40 which lead from a suction chamber 21$^b$ which takes its water from the water passage 41 through an opening controlled by a check valve 23$^b$. The delivery tube 12$^b$ delivers to a chamber or passage 42, the outlet from which is past the discharge valve 30 arranged to open outward against the counterpressure in the discharge pipe 31. The steam nozzles 10$^a$ and 10$^b$ receive steam from the steam chamber 14, and the nozzles are provided with shut-off valves 44 and 45 respectively. A valve 43 is provided in the steam inlet 13 for regulating the steam supply. The valves 44 and 45 are connected by a cross bar 46 to a sliding operating rod 47 which passes through a stuffing box, and is operated from outside of the injector casing by suitable means. The injector is provided with a starting or overflow valve 48 which may be of any usual or suitable form and which controls communication from the delivery end of the first and second tubes of the injector through passages 49 and 50 to the overflow outlet 51. The overflow valve may be operated in the usual manner through connections from the operating devices provided for giving endwise movement to the rod 47 for operating the nozzle valves 44 and 45.

The general operation of the injector is the same as with the double tube injectors of the type known as the Koerting universal double tube injectors, the first injector tube acting to draw water from the inlet 19 and to discharge it through the passage 41 to the suction chamber 17$^b$ of the second injector tube under pressure, and the second injector tube operating to impel the water from its suction chamber under increased pressure to and past the discharge valve 30. The injector is started also in the usual manner by the outward movement of the operating rod 47. When this rod is moved outward, the valve 44 is first raised because of the greater steam pressure on the larger valve 45, and the first or supply tube then begins to operate, discharging its water at first past the overflow valve 48 to the overflow outlet. As the operating rod 47 is moved farther outward, the valve 45 is opened and the overflow valve closes the passage 49. The water from the first tube is then forced through the passage 41 to the suction chamber 17$^b$, and the second or feeding tube comes into operation with its discharge end in communication with the overflow outlet. Then by the continued movement of the operating devices for the valve rod 47, the starting valve is caused to close the passage 50, and the discharge of the feed water is then effected past the discharge valve 30. When the steam valve 43 is open to cause the injector to operate at full capacity, the steam discharging from the nozzles 10$^a$ and 10$^b$ imparts such excess velocity to the water in the mixing nozzles 11$^a$ and 11$^b$ that secondary water is, because of the diminution of pressure beyond the critical portions of the injector tubes as hereinbefore explained, drawn into the injector tubes through the inlet openings 40 and is impelled with the primary water against the counterpressure. When the steam supply to the chamber 14 is more or less decreased, the velocity and quantity of water delivered by the primary mixing couples of the two tubes also decreases, and when the velocity of the water through the critical cross-section is reduced to the velocity which corresponds to the counterpressure the sucking in of secondary water ceases, the valves 23$^a$ and 23$^b$ closing automatically, and the apparatus then working like an ordinary double tube injector.

Further regulation may be secured by providing means for independently regulating the steam supply to, or capacity of, the nozzle 10$^a$ of the supply tube. Fig. 3 shows the steam nozzle 10$^a$ provided with a regulating spindle 15$^a$ for this purpose. The spindle extends through the hollow spindle 52 of the valve 44 and is mounted as shown or in any other suitable manner so as to be adjustable endwise independently of the movement of the valve 50.

Other modification and embodiments of the invention will suggest themselves, and it will be understood that the invention is not to be limited to the exact constructions shown, but that it includes changes and modifications thereof within the claims.

What is claimed is:—

1. An injector having a mixing couple for steam and water comprising a nozzle and a converging combining tube and having an inlet for admitting secondary water to the injector tube beyond the critical part of the injector tube, or part of smallest cross-section.

2. An injector having a mixing couple for steam and water comprising a nozzle and a converging combining tube and having an inlet for admitting secondary water to the injector tube beyond the point where the combining tube of the mixing couple for steam and water reaches its smallest cross-section.

3. An injector having a mixing couple for steam and water comprising a nozzle and a converging combining tube and having an inlet for admitting secondary water to the injector tube beyond the point where the combining tube of the mixing couple for steam and water reaches its smallest cross-section, and a check valve for controlling the supply passage leading to said inlet.

4. An injector having a mixing couple for steam and water comprising a nozzle and a converging combining tube and having the steam inlet of the mixing couple for steam and water of a size to admit steam in sufficient quantity to impel the water with a velocity in excess of that required to overcome the counterpressure, and having an inlet for admitting secondary water to the injector tube beyond the point where the combining tube of the mixing couple for steam and water reaches its smallest cross-section.

5. In an injector, the combination of a mixing couple for steam and water having a converging combining tube and having the steam inlet of a size to admit steam in sufficient quantity to impel the water with a velocity in excess of that required to overcome the counterpressure, an inlet for admitting secondary water to the injector tube beyond the point where the combining tube of the mixing couple for steam and water reaches its smallest cross-section, and means for regulating the steam supply.

6. In an injector, the combination with a mixing couple for steam and water having a converging combining tube and having the steam inlet of a size to admit steam in sufficient quantity to impel the water with a velocity in excess of that required to overcome the counterpressure, an inlet for admitting secondary water to the injector tube beyond the point where the combining tube of the mixing couple for steam and water reaches its smallest cross-section, a suction chamber from which said inlet for secondary water leads, a check valve in the supply inlet to said suction chamber, means for regulating the steam supply, and a valve for regulating the supply of water to the mixing couple for steam and water.

7. In an injector, the combination with the primary mixing couple for steam and water comprising a nozzle and a converging combining tube, of a secondary combining tube for drawing in secondary water arranged to receive the discharge from the primary combining tube.

8. In an injector, the combination with the primary mixing couple for steam and water comprising a nozzle and a converging combining tube, and the pressure cone, of a secondary combining tube between the primary combining tube and the pressure cone for drawing in secondary water.

9. In an injector, the combination with the primary mixing couple for steam and water comprising a nozzle and a converging combining tube, of a secondary combining tube for drawing in secondary water arranged to receive the discharge from the primary combining tube, a suction chamber for supplying the primary mixing couple, and a separate suction chamber for the secondary combining tube.

10. In an injector, the combination with the primary mixing couple for steam and water comprising a nozzle and a converging combining tube, of a secondary combining tube for drawing in secondary water arranged to receive the discharge from the primary combining tube, a suction chamber for supplying the primary mixing couple, a separate suction chamber for the secondary combining tube, a valve for regulating the supply of water to the first said suction chamber, and a check valve in the inlet to the second said suction chamber.

11. In an injector, the combination with the primary mixing couple for steam and water comprising a nozzle and a converging combining tube, of a secondary combining tube for drawing in secondary water arranged to receive the discharge from the primary combining tube, a passage for the supply of water to said secondary combining tube, and a check valve in said passage.

12. In an injector, the combination with the primary mixing couple for steam and water comprising a nozzle and a converging combining tube, of a secondary combining tube for drawing in secondary water arranged to receive the discharge from the primary combining tube, and means for regulating the supply of steam to the primary mixing couple.

13. In an injector, the combination with a steam nozzle and a converging combining tube forming a primary mixing couple for steam and water, of a secondary combining tube for drawing in secondary water arranged to receive the discharge from the primary combining tube, and a regulating spindle in the steam nozzle.

14. In an injector, the combination of a primary mixing couple for steam and water comprising a nozzle and a combining tube, a secondary mixing couple comprising a nozzle arranged in line with but separated from the primary combining tube and a secondary combining tube having a throat of greater cross-section than the throat of the primary combining tube, means for supplying secondary water to the secondary combining tube, and a delivery tube receiving the discharge from the secondary combining tube.

15. In an injector, the combination of a primary mixing couple for steam and water comprising a nozzle and a converging combining tube proportioned to impel the water with an excess velocity, a delivery tube, and a suction inlet for admitting secondary water beyond the part of the injector tube of smallest cross-section.

16. A double-tube injector having its second or feeding tube provided with a mixing couple for steam and water comprising a nozzle and a converging combining tube and with an inlet for admitting secondary water beyond the point where the combining tube of its mixing couple for steam and water reaches its smallest cross-section.

17. A double-tube injector having its second or feeding tube provided with a mixing couple for steam and water comprising a nozzle and a converging combining tube and with an inlet for admitting secondary water beyond the point where the combining tube of its mixing couple for steam and water reaches its smallest cross-section, and having a suction chamber from which said inlet for secondary water leads and which receives its water from the chamber into which the first or supply injector tube discharges, and a check valve between said suction chamber and the chamber into which the first injector tube discharges.

18. A double-tube injector having each of its injector tubes provided with a mixing couple for steam and water comprising a nozzle and a converging combining tube and with an inlet for admitting secondary water beyond the point where the combining tube of its mixing couple for steam and water reaches its smallest cross-section.

19. A double-tube injector having each of its injector tubes provided with a mixing couple for steam and water comprising a nozzle and a converging combining tube and with an inlet for admitting secondary water beyond the point where the combining tube of its mixing couple for steam and water reaches its smallest cross-section, and having means for regulating the joint steam supply to both injector tubes.

20. A double-tube injector having each of its injector tubes provided with a mixing couple for steam and water comprising a nozzle and a converging combining tube and with an inlet for admitting secondary water beyond the point where the combining tube of its mixing couple for steam and water reaches its smallest cross-section, and having means for regulating the steam supply to the second injector tube, and means for independently regulating the steam supply to the first injector tube.

21. A double-tube injector having its second or feeding tube provided with a mixing couple for steam and water comprising a nozzle and a converging combining tube and with a secondary combining tube between its main combining tube and its delivery tube for drawing in secondary water.

22. A double-tube injector having its second or feeding tube provided with a mixing couple for steam and water comprising a nozzle and a converging combining tube and with a secondary combining tube between its main combining tube and its delivery tube, and having a suction chamber for said secondary combining tube which receives its water from the chamber into which the first injector tube discharges.

23. A double-tube injector having each of its injector tubes provided with a mixing couple for steam and water comprising a nozzle and a converging tube and with a secondary combining tube between its main combining tube and its delivery tube for drawing in secondary water.

In testimony whereof, I have hereunto set my hand, in the presence of two subscribing witnesses.

ERNST KOERTING. [L. S.]

Witnesses:
ANGELO BORAGIUS,
C. W. FERRAR.

---

Copies of this patent may be obtained for five cents each, by addressing the "Commissioner of Patents, Washington, D. C."